(12) United States Patent
Spudic et al.

(10) Patent No.: US 10,516,328 B2
(45) Date of Patent: Dec. 24, 2019

(54) CONTROLLING A THREE-PHASE ELECTRICAL CONVERTER

(71) Applicant: ABB Schweiz AG, Baden (CH)

(72) Inventors: Vedrana Spudic, Zürich (CH); Eduardo Rohr, Baden (CH); Tobias Geyer, Ennetbaden (CH); Peter Al-Hokayem, Baden-Daettwil (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/877,333

(22) Filed: Jan. 22, 2018

(65) Prior Publication Data

US 2018/0145579 A1     May 24, 2018

Related U.S. Application Data

(63) Continuation of application No. PCT/EP2016/067200, filed on Jul. 19, 2016.

(30) Foreign Application Priority Data

Jul. 21, 2015   (EP) ..................................... 15177656

(51) Int. Cl.
*H02M 7/155*     (2006.01)
*H02M 1/12*     (2006.01)
(Continued)

(52) U.S. Cl.
CPC ........... *H02M 1/12* (2013.01); *H02M 7/1552* (2013.01); *H02M 7/487* (2013.01); *H02M 7/539* (2013.01); *H02M 2007/4835* (2013.01)

(58) Field of Classification Search
CPC ........ H02M 1/12; H02M 1/42; H02M 1/4225; H02M 1/4233; H02M 1/4241;
(Continued)

(56) References Cited

U.S. PATENT DOCUMENTS 8,766,570 B2   7/2014  Geyer

FOREIGN PATENT DOCUMENTS

EP      2469692 A1 *  6/2012   .............. H02M 1/12
EP      2469692 A1     6/2012
(Continued)

OTHER PUBLICATIONS

European Patent Office, International Search Report & Written Opinion issued in corresponding Application No. PCT/EP2016/067200, dated Oct. 18, 2016, 15 pp.
(Continued)

*Primary Examiner* — Nguyen Tran
*Assistant Examiner* — Bryan R Perez
(74) *Attorney, Agent, or Firm* — Taft Stettinius & Hollister LLP; J. Bruce Schelkopf

(57) ABSTRACT

A method for controlling a three-phase electrical converter comprises: selecting a three-phase optimized pulse pattern from a table of pre-computed optimized pulse patterns based on a reference flux; determining a two-component optimal flux from the optimized pulse pattern and determine a one-component optimal third variable; determining a two-component flux error from a difference of the optimal flux and an estimated flux estimated based on measurements in the electrical converter; determining a one-component third variable error from a difference of the optimal third variable and an estimated third variable; modifying the optimized pulse pattern by time-shifting switching instants of the optimized pulse pattern such that a cost function depending on the time-shifts is minimized, wherein the cost function comprises a flux error term and a third variable error term, wherein the flux error term is based on a difference of the flux error and a flux correction function providing a flux correction based on the time-shifts and the third variable error term is based on a difference of the third variable error (Continued)

and a third variable correction function providing a third variable correction based on the time-shifts; and applying the modified optimized pulse pattern to the electrical converter.

20 Claims, 5 Drawing Sheets

(51) Int. Cl.
  *H02M 7/539* (2006.01)
  *H02M 7/487* (2007.01)
  *H02M 7/483* (2007.01)

(58) Field of Classification Search
  CPC .. H02M 1/4258; H02M 1/425; H02M 1/4208; H02M 2007/4835; H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/05; H02M 7/539; H02M 7/1552
  See application file for complete search history.

(56) References Cited

FOREIGN PATENT DOCUMENTS

| EP | 2667279 A1 | 11/2013 |
|---|---|---|
| WO | 2013053399 A1 | 4/2013 |
| WO | 2015078656 A1 | 6/2015 |

OTHER PUBLICATIONS

European Patent Office, Extended Search Report issued in corresponding Application No. 15177656.4, dated Jan. 29, 2016, 12 pp.
Fard et al., "Analysis of a Modular Multilevel Inverter Under the Predicted Current Control. Based on Finite-Control-Set Strategy," 2013 3rd International Conference on Electric Power and Energy Conversion Systems, Yildiz Technical University, Istanbul, Turkey, Oct. 2-4, 2013, 6 pp.
Geyer et al., "Model Predictive Pulse Pattern Control," IEEE Transactions on Industry Applications, vol. 46, No. 2, Mar./Apr. 2012, pp. 663-676.
Kouro et al., :MOdel Predictive Control—A Simple and Powerful Method to Control Power Converters, IEEE Transactions on Industrial Electronics, vol. 56, No. 6, Jun. 2009, pp. 1826-1838.
Rodriguez et al., "State of the Art of Finite Control Set Model Predictive Control in Power Electronics," IEEE Transactions on Industrial Informatics, vol. 9, No. 2, May 2013, pp. 1003-1016.
R.E. Betz, T. Summers, T. Furney, Symmetry Compensation using a H-Bridge Multilevel STATCOM with Zero Sequence Injection, School of Electrical Engineering and Computer Science 2006, 1724-1731pp., University of Newcastle, NSW, Australia.
Thomas Bruckner, Donald Grahame Holmes, Optimum Pulse-Width Modulation for Three-Level Inverters, IEEE Transactions on Power Electronics, Jan. 2005, 82-89pp., vol. 20, No. 1, IEEE, Acapulco.
Buja, Giuseppe S., Optimum Output Waveforms in PWM Inverters, IEEE Transactions on Industry Applications, Nov./Dec. 1980, 830-836pp., vol. IA-16, No. 6, IEEE, Padova, Italy.
Wei-Neng Chang, Ching-Huan Liao, Real-Time Load Compensation by Using a Cascaded Multilevel Inverter-Based STATCOM, IEEE PEDS, Dec. 2011, 840-846pp., Department of Electrical Engineering, Chang Gung University, Singapore.
Sixing Du, Jinjun Liu, Jiliang Lin, Yingjie He. Control Strategy Study of STATCOM Based on Cascaded PWM H-bridge Converter With Delta Configuration, School of Electrical Engineering and State Key Lab of Electric Insulation and Power Equipment, Xi'an Jiaotong University, Jun. 2-5, 2012, 345-350pp., IEEE 7th International Power Electronics and Motion Control Conference—ECCE Asia, Harbin, China.
Tobias Geyer, Nikolaos Oikonomou, Georgios Papafotiou, Frederick Kieferndorf, Model Predictive Pulse Pattern Control, IEEE 2011, 3306-3313 pp., Phoenix, Arizona.
Tobias Geyer, Nikolaos Oikonomou, Georgios Papafotiou, Frederick Kieferndorf, Model Predictive Pulse Pattern Control, IEEE Transactions on Industry Applications vol. 48 No. 2, Mar./Apr. 2012, 563-676 pp., Phoenix, Arizona.
Makoto Hagiwara, Hirofumi Akagi, Control and Experiment of Pulsewidth-Modulated Modular Multilevel Converters, IEEE Transactions on Power Electronics, Jul. 2009, 1737-1746 pp., vol. 24, No. 7, Tokyo, Japan.
Makoto Hagiwara, Ryo Maeda, Hirofumi Akagi, Control and Negative-Sequence Reactive-Power Control by a PWM STATCOM Based on a Modular Multilevel Cascade Converter (MMCC-SDBC), IEEE Transactions on Industry Applications, Mar./Apr. 2012, 720-729 pp., vol. 48, No. 2, Phoenix, Arizona.
Joachim Holtz, Nikolaos Oikonomou, Neutral Point Potential Balancing Algorithm at Low Modulation Index for Three-Level Inverter Medium-Voltage Drives, IEEE Transactions on Industry Applications, May/Jun. 2007, 161-768pp., vol. 43, No. 3, Hong Kong.
Kalle Illves, Antonios Antonopoulos, Lennart Harnefors, Staffan Norrga, Hans-Peter Nee, Circulating Current Control in Modular Multilevel Converters with Fundamental Switching Frequency, IEEE 7th International Power Electronics and Motion Control Conference—ECCE Asia, Jun. 2-5, 2012, 249-256pp., Harbin, China.
C. Newton, M. Sumner, Neutral Point Control for Multi-Level Inverters: theory, design and operational limitations, IEEE Industry Applications Society Annual Meeting, Oct. 5-9, 1997, 1336-1343pp., New Orleans, Louisiana.
Satoshi Ogasawara, Hirofumi Akagi, Analysis of Variation of Neutral Point Potential in Neutral-Point-Clamped Voltage Source PWM Inverters, Okayama University, 1993, 965-970pp., Okayama, Japan.
Hasmukh S. Patel, Richard G. Goft, Generalized Techniques of Harmonic Elimination and Voltage Control in Thyristor Inverters: Part I-Harmonic Elimination, IEEE Transactions on Industry Applications May/Jun. 1973, 310-317pp., Philadelphia, Pennsylvania.
R. Picas, J. Pou, S. Ceballos, J. Zaragoza, G. Konstantinou, V. G. Agelidis, Optimal Injection of Harmonics in Circulating Currents of Modular Multilevel Converters for Capacitor Voltage Ripple Minimization, IEEE, 2013, 318-324pp., Spain.
Josep Pou, Rafael Pindado, Dushan Boroyevich, Pedro Rodriguez, Evaluation of the Low-Frequency Neutral-Point Voltage Oscillations in the Three-Level Inverter, IEEE Transactions on Industrial Electronics, Dec. 2005, 1582-1588pp., vol. 52, No. 6, Spain.
Michael Sprenger, Rodrigo Alvarez, Steffen Bernet, Direct Dead-Time Control—A Novel DC-Link Neutral-Point Balancing Method for the Three-Level Neutral-Point-Clamped Voltage Source Inverter, IEEE, 2012, 1157-1163 pp.
Jurgen K. Steinke, Switching Frequency Optimal PWM Control of a Three-Level Inverter, IEEE Transactions on Power Electronics, Jul. 1992, 487-496 pp., vol. 7, No. 3, IEEE Power Electronics and Applications, Aachen Germany.

\* cited by examiner

US 10,516,328 B2

CONTROLLING A THREE-PHASE ELECTRICAL CONVERTER

FIELD OF THE INVENTION

The invention relates to the field of control of high power converters. In particular, the invention relates to a method and a controller for controlling a three-phase electrical converter. Furthermore, the invention relates to a converter system with such a controller.

BACKGROUND OF THE INVENTION

Optimized Pulse Patterns (optimized pulse patterns) may be precomputed patterns of output voltage levels of an electrical converter, which have been optimized with respect to spectral characteristics. The optimization criteria used for computing the optimized pulse pattern may be adapted to a specific application. For machine-connected converters, the objective is typically to reduce the Total Harmonic Distortion (THD) of current or flux, which achieves a motor-friendly operation and prolongs the operating lifetime of the machine. For grid-connected converters, the output current spectrum typically needs to be shaped in order to satisfy grid codes.

The computation method for optimized pulse patterns allows spectrum shaping by employing different cost weights or constraints on different spectral components. Optimized pulse patterns corresponding to different modulation indices are computed offline and stored into a controller memory. During operation of the converter, i.e. online, they are selected for the generation of switching commands based on a modulation index reference, which may be determined from a reference flux, reference voltage or reference current for the converter.

The use of optimized pulse patterns is an established approach for multi-level converter modulation, however, traditional control systems that use optimized pulse patterns usually are limited in performance and flexibility. A typical control system comprises a slow PI loop that determines the modulation index reference, based on which different optimized pulse patterns are read from memory and applied to the system.

Recently, a new method for converter control based on optimized pulse patterns has been proposed, which is based on model predictive control. For example, EP 2 469 692 A1 relates to a method for controlling a converter, in which optimized pulse patterns are modified with model predictive control. The method is based on online adaptation of the switching instances of the optimized pulse patterns. The adaptation of the switching instances is done following the concepts of Model Predictive Control. In EP 2 469 692 A1, the objective of the online control is to track the converter flux reference, provided in $\alpha\beta$ coordinates (i.e. it is provided after a two-dimensional Clarke transformation). An outer control loop determines a required $\alpha\beta$ flux reference and model predictive control insures that, by appropriately shifting the switching instances, the tracking error is reduced. The method demonstrates very good dynamic performance and thus enables the use of precomputed pulse patterns in dynamically challenging applications.

The objective to track the converter flux in the $\alpha\beta$ coordinate system is typical in converter control. For converters connected to the induction machine, the converter flux corresponds to the stator flux of the machine. By controlling the stator flux in $\alpha\beta$ coordinates, one can control the machine torque and magnetization. For grid-connected converters, tracking the converter flux may accomplish the control of active and reactive power exchange with the grid.

However, control of the converter flux in $\alpha\beta$ is not the sole objective of the converter control. Typically, there is an additional objective related to the energy balancing of the converter. For modular multi-level converters in delta configuration, which are used in STATCOMs and HVDC applications, the additional objective usually is energy balancing of the converter branches, which is achieved by controlling the circulating current. For neutral point clamped converters, a typical objective is balancing of the upper and lower capacitor voltages of the DC link, i.e. the control of the neutral point potential.

However, the control of further quantities, in addition to $\alpha\beta$ flux control, is typically done using outer loops and post-processing. Such solutions, which for example include further switching pulses, typically increase the switching frequency, which is highly undesired.

For example, in WO 2013 053 399 A1, circulating currents are controlled for energy balancing of a modular multi-level converter in delta connection.

Also EP 2 667 279 A1 describes a control method for a modular multi-level in a Statcom application, in which a circulating current is controlled.

KOURO S et al: "Model Predictive Control-A Simple and Powerful Method to Control Power Converters", IEEE TRANSACTIONS ON INDUSTRIAL ELECTRONICS, IEEE SERVICE CENTER, PISCATAWAY, N.J., USA, vol. 56, no. 6, 1 Jun. 2009, pages 1826-1838, relates to FCS-MPC (Finite Control Set Model Predictive Control), in which possible future switching states are determined and a cost function is evaluated on each possible switching state to determine a switching state with a minimal cost function, which is then used as next state applied to a converter. It is mentioned that different variables can be included into the cost function.

JOSE RODRIGUEZ et al: "State of the Art of Finite Control Set Model Predictive Control in Power Electronics", IEEE TRANSACTIONS ON INDUSTRIAL INFORMATICS, IEEE SERVICE CENTER, NEW YORK, N.Y., US, vol. 9, no. 2, 1 May 2013, also relates to FCS-MPC and also mentions that the cost function may be based on a set of different objectives.

FARD RAZIEH NEJATI et al: "Analysis of a Modular Multilevel inverter under the predicted current control based on Finite-Control-Set strategy", 2013 3RD INTERNATIONAL CONFERENCE ON ELECTRIC POWER AND ENERGY CONVERSION SYSTEMS, IEEE, 2 Oct. 2013, pages 1-6, is a further article relating to FCS-MPC proposing a cost function based on measured and estimated voltages and currents in a converter system.

DESCRIPTION OF THE INVENTION

It is an objective of the invention to include a further control objective in a control method based on optimized pulse patterns, which are online modified with model predictive control, which control objective is included in a simple, computationally not demanding way and which generates no additional total harmonic distortion.

This objective is achieved by the subject-matter of the independent claims. Further exemplary embodiments are evident from the dependent claims and the following description.

An aspect of the invention relates to a method for controlling a three-phase electrical converter.

According to an embodiment of the invention, the method comprises: selecting online a three-phase optimized pulse pattern from a table of precomputed optimized pulse patterns based on a reference flux (trajectory); determining a two-component (Clarke transformed) optimal flux (trajectory) from the optimized pulse pattern and a one-component optimal third variable (trajectory); determining a two-component flux error (trajectory) from a difference of the optimal flux (trajectory) and an estimated flux (trajectory) estimated based on measurements in the electrical converter; determining a one-component third variable error (trajectory) from a difference of the optimal third variable (trajectory) and an estimated third variable (trajectory); modifying the optimized pulse pattern by time-shifting switching instants of the optimized pulse pattern such that a cost function depending on the time-shifts is minimized, wherein the cost function comprises a flux error term and a third variable error term, wherein the flux error term is based on a difference of the flux error (trajectory) and a flux correction function providing a flux correction based on the time-shifts, and the third variable error term is based on a difference of the third variable error (trajectory) and a third variable correction function providing a third variable correction based on the time-shifts.

As indicated above, the reference flux, the optimal flux, the estimated flux and the flux error may be trajectories, i.e. they may provide values at a number of different future time points and/or time instants. Also, the optimal third variable, the estimated third variable and the third variable error may be trajectories.

Furthermore, the reference flux, the optimal flux, the estimated flux and the flux error may be seen as two-component vectors. In particular, they may be provided in the $\alpha\beta$ reference system, i.e. may be determined by a two-component Clarke transformation. Thus, the flux related variables may be seen as first and second variables.

It also should be noted that the optimal flux, the optimal third variable and also "optimal" quantities mentioned below are not called "optimal" because they are optimal for the converter. They are named in this way, because they are derived from an optimized pulse pattern.

In general, the method online optimizes an offline optimized pulse pattern with a control objective that has three degrees of freedom. The first two degrees relate to a Clarke transformed converter flux, which, for example, may be determined by integrating each phase of the converter voltage and apply a two-dimensional Clarke transformation on the result. The third degree of freedom relates to a third variable, which directly or indirectly may relate to the third component of a three-dimensional Clarke transformation. This third component may be zero, when the three phases are balanced. Otherwise, it may provide a further degree of freedom that may be controlled.

It may be possible that the optimal third variable is determined from the optimized pulse pattern, for example as third component of a converter flux. It also may be possible that the third variable is determined without the usage of the optimized pulse pattern. For example, it may be directly determined from a reference (such as a current and/or voltage reference) provided by an outer control loop.

In the case, the flux (or the voltages from which the flux may be determined) is not balanced, there is a third degree of freedom that may be utilized by the method to optimize a further, third variable. This third variable may be a common mode voltage, another internal state variable of the converter or a quantity relating to the common mode voltage such as a neutral point voltage. Also circulating currents may be controlled based on a third variable.

Usually, when a three-phase system is balanced, a two-component Clarke transform may be used to project the existing degrees of freedom to a two-component variable, such as a two-component flux. In the case of imbalance, the Clarke transformation may be expanded to a transformation to a three-component variable. In the case of a flux, this three-component variable may comprise the two-component flux and a third flux component. In general, the method may be seen as a method for also controlling the converter based on a quantity relating to this third flux component.

In one embodiment, the method selects an unmodified optimized pulse pattern from a table, which, for example, may be done based on a reference voltage magnitude and reference frequency of the converter. From the unmodified optimized pulse pattern, a three-phase optimal voltage and therefrom the two-component optimal reference flux in the $\alpha\beta$ reference system may be determined. Furthermore, the optimal third variable may be determined from the unmodified optimized pulse pattern, for example as third component of a Clarke transform.

Additionally, from measurements in the converter system, estimated quantities may be determined, such as an estimated flux and an estimated third variable. The differences between the optimal quantities and the estimated quantities provide errors, such as a flux error and a third variable error.

These errors may be used as input to model predictive control, which tries to compensate these errors by time-shifting switching instants of the optimized pulse pattern. In model predictive control, a cost function based on the errors and correction functions, which depend on the time-shifts, is minimized, which, for example, may be performed by solving online a quadratic programming. In particular, cost function comprises a term based on a quadratic norm of a difference of the flux error and a flux correction function and a further term based on a quadratic norm of a difference of the third variable error and a third variable correction function.

The method may furthermore comprise: applying the modified optimized pulse pattern to the electrical converter. The output of the method may be an optimized pulse pattern with time-shifted switching instants that indicate, which voltage level has to be generated by the electrical converter in each phase. These voltage levels may be translated into switching commands of semiconductor switches of the electrical converter, which are applied to the electrical converter at the specific switching instants.

According to an embodiment of the invention, the flux error term and the third variable term have different weight factors. With such weight factors, it may be controlled which error is compensated more than the other error, if both errors cannot be fully compensated simultaneously.

According to an embodiment of the invention, the cost function comprises a third term quadratic in the time shifts. This term penalizes large time-shifts such that the optimization goals of the offline computed optimized pulse patterns may be preserved as much as possible.

According to an embodiment of the invention, the optimal flux, the estimated flux, the flux error, the optimal third variable, the estimated third variable and/or the third variable error are computed over a predefined prediction horizon. Such a horizon may comprise two or more switching instants in each phase. The switching instants of the optimized pulse pattern may be time-shifted within the prediction horizon.

According to an embodiment of the invention, the predefined prediction horizon is longer than two or more future time steps and only switching instants of the modified optimized pulse pattern during the next time step are applied to the electrical converter. A receding horizon policy may be performed by the controller. The method may be performed every time step of the controller and the future trajectory of the modified pulse pattern may be computed for two or more future time steps. However, only the switching instants determined for the next future time step are the applied to the converter. In the next time step, the method may be performed again. For example, a time step may be the smallest time interval considered by the controller.

According to an embodiment of the invention, only the next future switching instants in every phase are time-shifted. Thus, a method may be seen as a deadbeat control method, which may perform very fast.

According to an embodiment of the invention, the flux correction function and/or the third variable correction function is linear in the time-shifts. In such a way, the cost function is at least quadratic in the time-shifts, which may facilitate solving the optimization problem.

According to an embodiment of the invention, the cost function is minimized by online solving a quadratic program. Alternatively, the quadratic program/programming may be solved offline and the resulting solution may be evaluated online. This quadratic program also may comprise constraints, such as a constraint that the switching instants may not be shifted beyond each other, i.e. may not change their order, in each phase.

According to an embodiment of the invention, the third variable is based on a neutral point potential of a DC link of a neutral point clamped converter. When not controlled, the neutral point potential of a split DC link is usually floating around the middle value between the positive and negative DC link potential. The third variable controlled with the method may be neutral point potential or a quantity derived from it such as a running average of the neutral point potential.

According to an embodiment of the invention, the optimal third variable is the optimal neutral point potential determined from the optimized pulse pattern and the estimated third variable is the estimated neutral point potential determined from measurements in the converter. Similar to the optimal reference flux, the optimal neutral point potential may be determined from the shape (switching instants and voltage levels) of the optimized pulse pattern and a model of the converter. Furthermore, the actual and future neutral point potential may be estimated from the measurements in the system. The difference of these two quantities may be used as error that is compensated by shifting switching instants.

According to an embodiment of the invention, a low pass filter is applied to the estimated neutral point potential and/or the estimated neutral point potential is averaged to control a drift of the neutral point potential. The neutral point potential usually cannot be controlled to be zero all the time but has natural variations around the zero point due to the converter topology and because of the harmonics generated by the pulse width modulation. However, a control objective may be to control an average value of the neutral point potential to be zero, i.e. to control a drift. This, for example, may be done by averaging the neutral point potential error or by filtering out higher order contributions of the harmonic content of the neutral point potential error.

According to an embodiment of the invention, higher order contributions to the neutral point potential are offline precomputed for each optimized pulse pattern in the table and added to the estimated neutral point potential to control a drift of the neutral point potential. It also may be possible not to calculate the higher order contributions in the optimal neutral point potential online but to calculate them offline and to store them together with the corresponding optimized pulse pattern.

According to an embodiment of the invention, the optimal third variable is a neutral point flux determined from an optimal neutral point potential integrated over time and the estimated third variable is the corresponding estimated neutral point flux determined from measurements in the converter. A further possibility is to control the integral over the neutral point potential, i.e. a flux related to the neutral point potential.

According to an embodiment of the invention, the third variable is based on a circulating current of a modular multi-level converter. In modular multi-level converters, circulating currents between different converter branches that are connected in a conducting loop may be generated due to asymmetric switching of converter cells. For example, the third variable may be a flux determined from the circulating current.

According to an embodiment of the invention, the optimized pulse pattern have been precalculated such that they generate no (or nearly no) common mode voltage and an optimal third variable is directly determined from a circulating current reference. In the case, the unmodified optimized pulse patterns do not generate circulating currents by themselves, and the third component of a Clarke transformed three-component optimal flux may be assumed to be zero. The third variable may be directly determined from a circulating current reference provided by an outer control loop without the usage of the optimized pulse patterns. Based on measurements in the system, the third variable flux may be determined based on a model of the converter and the circulating current reference.

According to an embodiment of the invention, a Clarke transformed three-component optimal flux is determined from the optimized pulse pattern and split into the two-component optimal flux and into a one-component flux as optimal third variable. In the case, the optimized pulse patterns have been optimized to generate a common mode voltage (or at least a limited amount of common mode voltage), the optimal third variable may be the third component of the converter flux determined from the selected optimized pulse pattern.

A further aspect of the invention relates to a controller for an electrical converter adapted for performing the method as described in the above and in the following. The method may be implemented at least partially in software and/or hardware. For example, the controller may comprise a processor on which a computer program performing the method is executed. The controller also may be based on an FPGA or DSP.

A further aspect of the invention relates to a converter system, which comprises an electrical converter interconnected with an electrical grid and such a controller. It has to be understood that features of the method as described in the above and in the following may be features of the controller and the converter system as described in the above and in the following, and vice versa.

According to an embodiment of the invention, the electrical converter is a neutral point clamped converter adapted for converting a three-phase AC current into a DC current in a split DC link. The split DC link may comprise two series-connected capacitors which interconnect a positive point, a neutral point and a negative point of the DC link. The positive and the negative point of the DC link may be connected via converter arms of two series-connected semiconductor switches with each of the phases of the AC side of the converter. The neutral point may be connected via diodes between the semiconductor switches of each converter arm. In this case, the control method may control the DC link neutral point potential as third variable.

According to an embodiment of the invention, the electrical converter is a modular multi-level converter comprising at least two converter branches and each converter branch comprises a plurality of converter cells with own cell capacity. For example, the electrical converter may comprise three branches delta-connecting or star-connecting three phases of the electrical grid. Such a converter may be used in a Statcom application. The converter cells of a converter branch may be series-connected bipolar converter cells. Each converter cell may comprise four semiconductor switches adapted for connecting the cell capacitor of the converter cell to the branch or for disconnecting the cell capacitor from the branch. In this case, the control method may control a circulating current through the delta-connected branches as third variable.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
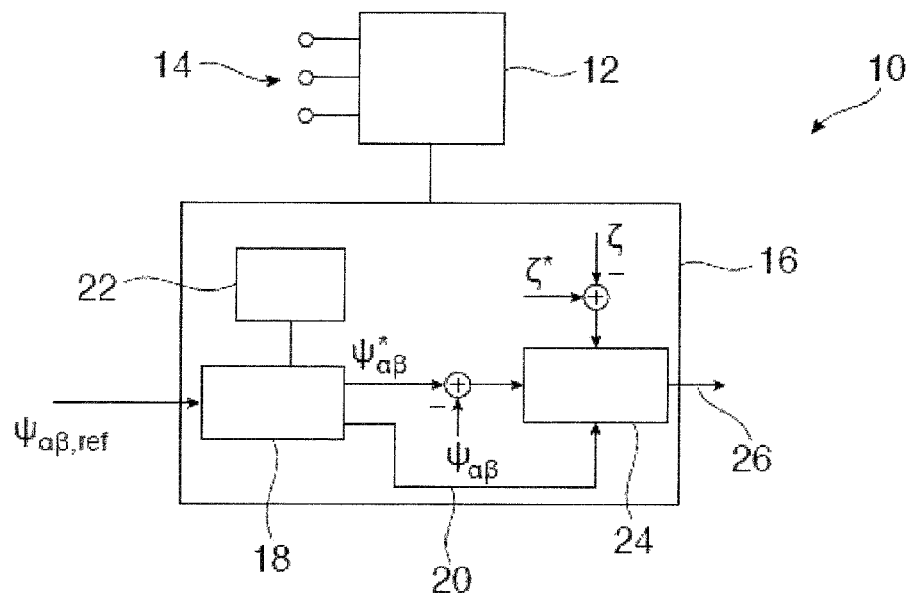
FIG. 1 schematically shows a converter system according to an embodiment of the invention.

FIG. 1 shows a converter system 10 comprising an electrical converter 12, which is connected to a three-phase electrical grid 14. For example, the electrical converter 12 may be adapted for converting an AC voltage from the grid 14 into a DC current or the electrical converter may supply the electrical grid with electrical energy from another grid.

The converter system 10 and in particular the electrical converter 12 is controlled by a controller 16, which receives measurement values obtained in the system 10 and which generates switching commands for switching the converter 12. In particular, the controller 16, in pattern selector block 18 receives a reference flux $\psi_{\alpha\beta,ref}$ and selects an optimized pulse pattern 20 based on the reference flux $\psi_{\alpha\beta,ref}$ from a table 22. Furthermore, the pattern selector 18 determines an optimal flux $\psi^*_{\alpha\beta}$ from the optimized pulse pattern and calculates a flux error from by subtracting an estimated flux $\psi_{\alpha\beta}$, which has been determined from measurements in the system 10, from the optimal flux $\psi^*_{\alpha\beta}$.

The pattern optimizer block 24 receives the optimized pulse pattern 20 and the flux error and furthermore receives a third variable error based on a difference of an optimal third variable $\zeta^*$ and an estimate $\zeta$ for the third variable, also based on measurements in the system 10. From these inputs, the pattern optimizer 26 modifies time instants of the optimized pulse pattern 20 with respect to the optimization goal to minimize/compensate the errors and generates a modified optimized pulse pattern 26.

General Overview of the Method

Figure 2:
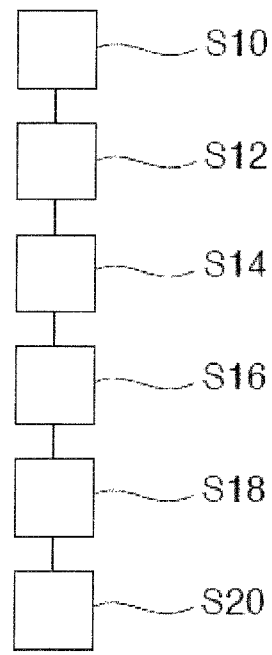
FIG. 2 shows a flow diagram illustrating a method for controlling an electrical converter according to an embodiment of the invention.

FIG. 2 shows a flow diagram illustrating a method for controlling the converter 12, which may be performed by the controller 16.

In step S10, based on the converter reference flux $\psi_{\alpha\beta,ref}$, a reference flux angle $\theta^*$, modulation index $m^*$ and pulse number $d^*$ are determined and based on the modulation index and pulse number an appropriate optimized pulse pattern 20 is selected. Based on the flux angle $\theta^*$, the optimized pulse pattern 20 is read out such that it corresponds to the current time instant of a fundamental cycle/period of the voltage phases of the converter 12. The table 22 may provide the optimal flux $\psi^*_{\alpha\beta}$ and the optimal switch positions in all three phases $u_{abc}$. Based on the optimal switch positions, the optimal third variable, $\zeta^*$, may also be computed.

Figure 3:
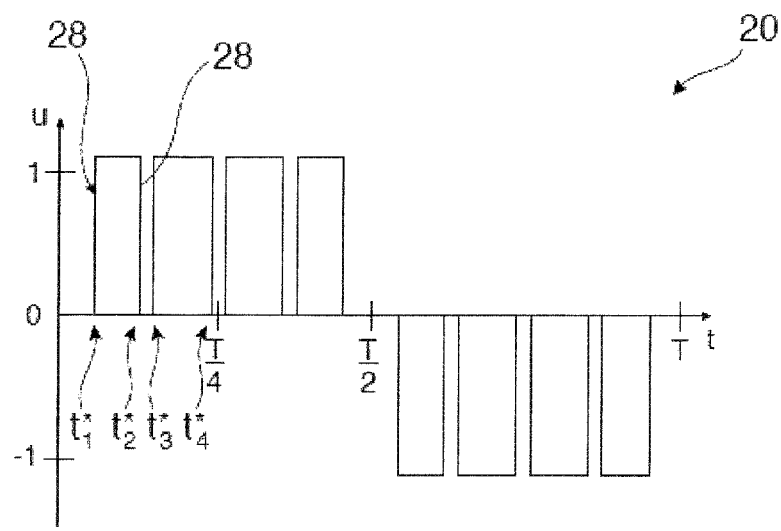
FIG. 3 shows a diagram with an optimized pulse pattern used in the method of FIG. 2.

FIG. 3 shows an example of an optimized pulse pattern 20. The optimized pulse patterns 20 in the table 22 corresponding to different modulation indices have been computed offline. The optimized pulse patterns 20 may be described by the switching instances $[\theta_{sw,1} \ldots \theta_{sw,d}]^T$ (reference numeral 28 indicates example) and change of switch positions at switching instances $[\Delta u_i \ldots \Delta u_d]$. Here, $d^*$ denotes a pulse number, which is equal to a number of switching events that occur in a quarter-wave, and $\Delta u_i$ is defined as $\Delta u_i = u(t_i) - u(t_i - dt)$, where $dt$ denotes an infinitesimal time step.

The optimized pulse patterns 20 may be defined on one quarter of the fundamental period, while the rest of the optimized pulse patterns 20 may be obtained by applying the quarter-wave symmetry rules.

The modulation patterns for the three-phase system 10, characterized by switching instances $t^*_{ai}, t^*_{bi}, t^*_{ci}, i=1, \ldots, d$, are obtained by shifting the optimized pulse patterns 20 relatively to each other by one third of the fundamental period.

By integrating the optimized pulse pattern 20 and transforming the obtained flux into apt coordinates, the optimal flux $\psi^*_{\alpha\beta}$ is obtained. This map may be prestored (for example together with the optimized pulse pattern 20 in the table 22) or computed online.

Any three-phase vector quantity $\xi_{abc}=[\xi_a \xi_b \xi_c]^T$ may be transformed to $\xi_{\alpha\beta}=[\xi_\alpha \xi_\beta]^T$ in the stationary orthogonal $\alpha\beta$ coordinates with a two-dimensional Clarke transformation, as follows:

$$\xi_{\alpha\beta}=P\xi_{abc} \tag{1}$$

where the matrix $$P = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}.$$

In particular, the converter flux (at the machine/inverter side or the grid/rectifier side) is defined as integral of a three-phase voltage at the AC connection of the converter 12, $v_{abc}$:

$$\psi_{abc}(t) = \int_0^t v_{abc}(\tau)\,d\tau. \tag{2}$$

It follows that the converter flux in the $\alpha\beta$ coordinates is defined as:

$$\psi_{\alpha\beta}=P\psi_{abc}. \tag{3}$$

In addition, the $\gamma$ flux of a converter, denoted $\psi_\gamma$, may be defined as integral of the common mode converter voltage:

$$\psi_\gamma(t) = \int_0^t v_\gamma(\tau)\,d\tau = \frac{1}{3}\int_0^t (v_a(\tau)+v_b(\tau)+v_c(\tau))\,d\tau \tag{4}$$

The optimal third variable $\zeta$ is a function of pulse pattern switching times and, possibly, of other converter and modulation variables.

Returning to FIG. 2, in step S12 the flux error $\tilde{\psi}_{\alpha\beta}$ in the $\alpha\beta$ system is determined by $$\tilde{\psi}_{\alpha\beta}=\psi^*_{\alpha\beta}-\psi_{\alpha\beta}, \tag{5}$$

where $\psi^*_{\alpha\beta}$ is the optimal flux and $\psi_{\alpha\beta}$ is the estimated flux.

In step S14, the third variable error $\tilde{\zeta}$ is determined by $$\tilde{\zeta}=\zeta^*-\zeta, \tag{6}$$

where $\zeta$ denotes the third variable measurement/estimate and $\zeta^*$ denotes the optimal third variable.

Figure 4:
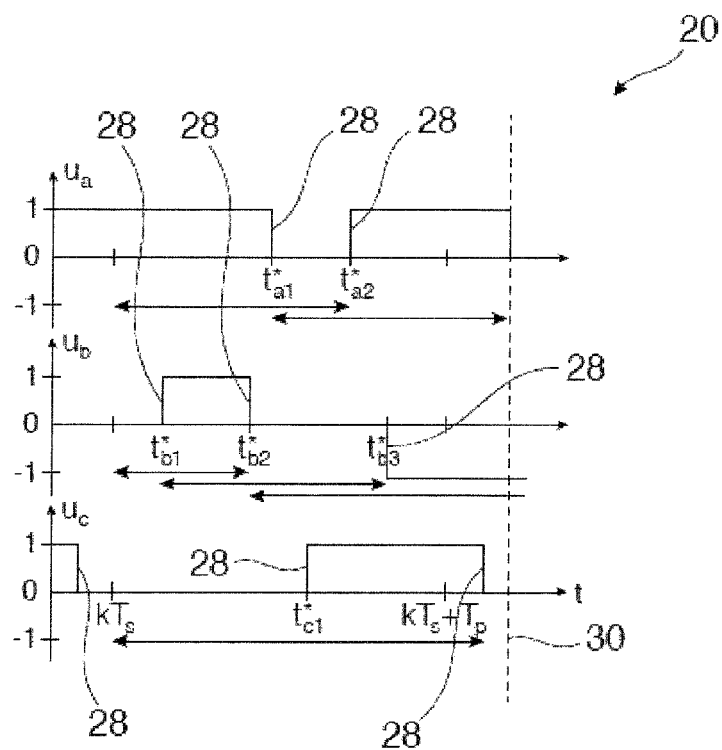
FIG. 4 shows a diagram illustrating shifted time instants as used in the method of FIG. 2.

In step S16, the optimized pulse pattern 20 is modified by time-shifting switching instants 28. FIG. 4 shows an example of an optimized pulse pattern 22 that has been determined over a specific prediction horizon 30. The diagram of FIG. 4 depicts the switching instants 28 and voltage levels $u_a$, $u_b$, $u_c$ for three phases a,b,c over time t.

The switching instants 28 are moved (shifted) in time t, such that an objective function J (explained below) is minimized.

The objective function J may penalize both the uncorrected error $\tilde{\psi}_{\alpha\beta}$, $\tilde{\zeta}$ of the controlled variables and the changes of the switching instants 28 (the manipulated variable), using the diagonal weight matrix R, whose components may be very small. Specifically, the optimization problem may be formulated as $$\min_{\Delta t} J(\Delta t) = \|\tilde{\psi}_{\alpha\beta} - \psi_{\alpha\beta,corr}(\Delta t)\|_2^2 + \lambda\|\tilde{\zeta} - \zeta_{corr}(\Delta t)\|_2^2 + \Delta t^T R \Delta t \tag{7a}$$

s.t.

$$kT_s \le t_{a1} \le t_{a2} \le \ldots \le t_{an_a} \le t^*_{a(n_a+1)} \tag{7b}$$

$$kT_s \le t_{b1} \le t_{b2} \le \ldots \le t_{bn_b} \le t^*_{b(n_b+1)} \tag{7c}$$

$$kT_s \le t_{c1} \le t_{c2} \le \ldots \le t_{cn_c} \le t^*_{c(n_c+1)}. \tag{7d}$$

Here, $\lambda \in \mathbb{R}$, $\lambda \ge 0$, and $R \in \mathbb{R}^{(n_a+n_b+n_c)\times(n_a+n_b+n_c)}$, $R \ge 0$, are weighting factors. The corrections of switching instants 28 are aggregated in the vector $$\Delta t=[\Delta t_{a1}\Delta t_{a2}\ldots \Delta t_{an_a}\Delta t_{b1}\ldots \Delta t_{bn_b}\Delta t_{c1}\ldots \Delta t_{cn_c}]^T. \tag{8}$$

For phase a, for example, the correction of the i-th transition time is given by $$\Delta t_{ai}=t_{ai}-t^*_{ai}, \tag{9}$$

where $t^*_{ai}$ denotes the nominal switching instant of the i-th transition $\Delta u_{ai}$. Again, the latter is defined as $\Delta u_a=u_a(t^*_{ai})-u_a(t^*_{ai}-dt)$ with dt being an infinitesimally small time step. Moreover, $n_a$ denotes the number of switching instants 28 in phase a that area within the prediction horizon 30, and $t^*_{a(n_a+1)}$ refers to the first nominal switching instants 28 beyond the horizon 30. The quantities for phases b and c are defined accordingly.

The switching instants 28 may not be modified arbitrarily. For the three phases, the set of constraints (7b)-(7d) may be imposed, which constraints the switching instants 28 in two ways. Firstly, the current time-instant $kT_s$, i.e. transitions cannot be moved into the past. Secondly, the neighboring switching instants in the same phase may not be moved beyond each other, ensuring that the correct sequence of switching instants 28 is kept.

For example, in FIG. 4, the first switching instant 28 in phase b is constrained to lie between $kT_s$ and the nominal switching instant of the second transition in phase b, $t^*_{b2}$. The second switching instant in phase b can only be delayed up to the nominal switching instant of the third transition in the same phase, $t^*_{b3}$. In this example, the number of transitions that fall within the prediction horizon 30 is $n_a=2, n_b=3$ and $n_c=1$. Note that the switching instants 28 in a given phase may be modified independently from those in the other phases.

The horizon length $T_p$ is a design parameter. If required, $T_p$ is increased so as to ensure that switching instants in at least two phases fall within the horizon 30. For example, in FIG. 4, in case $T_p$ is smaller than $t^*_{a1}-kT_s$, it is increased to this value.

Returning to FIG. 2, in step S18, switching instants 28 that will occur within the same sampling interval are removed from the modified pulse pattern 26. This may be accomplished by updating a pointer to the table 22 that stores the switching angles of the optimized pulse pattern 22 and the respective three-phase potential values.

In step S20, the switching commands for the semiconductor switches of the converter 12 are derived from the modified pulse pattern 26 over the sampling interval, i.e. the switching instants 28 and the associated switch positions. The switching commands may be applied to the converter 12 by sending them to gate units of the semiconductor switches in the converter 12.

Correction of the Converter Flux Vector

The flux error term $$J_1(\Delta t)=\|\tilde{\psi}_{\alpha\beta}-\psi_{\alpha\beta,corr}(\Delta t)\|_2^2 \tag{10}$$

penalizes the difference between the converter flux error at time t, which is given by (5), and a flux correction function applied to the stator flux over the time interval $[t,t+T_p]$. The difference between these two quantities is the uncorrected stator flux error at $t+T_p$. This quantity is penalized using a quadratic penalty in (10), where for any vector $x: \|x\|_2^2 = x^T x\|$.

The converter flux correction function in $\alpha\beta$ as a function of the modifications to the switching time instants $\Delta t$ may be written as $$\psi_{\alpha\beta,corr}(\Delta t) = -v_{dc} P \begin{bmatrix} \sum_{i=1}^{n_a} \Delta u_{ai} \Delta t_{ai} \\ \sum_{i=1}^{n_b} \Delta u_{bi} \Delta t_{bi} \\ \sum_{i=1}^{n_c} \Delta u_{ci} \Delta t_{ci} \end{bmatrix}, \quad (11)$$

where $v_{dc}$ corresponds to the voltage level of one step of the converter. This can be expanded to $$\psi_{\alpha\beta,corr}(\Delta t) = -V_1 \Delta t, \quad (12)$$

where $$V_1 = -\frac{v_{dc}}{3} \begin{bmatrix} 2\Delta u_{a1} & 0 \\ \vdots & \vdots \\ 2\Delta u_{an_a} & 0 \\ -\Delta u_{b1} & \sqrt{3}\Delta u_{b1} \\ \vdots & \vdots \\ -\Delta u_{bn_b} & \sqrt{3}\Delta u_{bn_b} \\ -\Delta u_{c1} & -\sqrt{3}\Delta u_{c1} \\ \vdots & \vdots \\ -\Delta u_{cn_c} & -\sqrt{3}\Delta u_{cn_c} \end{bmatrix}^T.$$

Inequality Constraints

The inequality constraints (7b)-(7d) may be written in matrix form. With the definition (9), it is straightforward to rewrite the constraints (7b) on the switching instants for phase a as $$G_a \Delta t \leq g_a, \quad (13)$$

with $$G_a = \begin{bmatrix} -1 & 0 & \ldots & & & \\ 1 & -1 & 0 & \ldots & & \\ 0 & 1 & -1 & 0 & \ldots & \\ \vdots & \ddots & \ddots & \ddots & \ddots & \\ & & \ldots & 0 & 1 & -1 & 0 \\ & & & \ldots & 0 & 1 & -1 \\ & & & & \ldots & 0 & 1 \end{bmatrix}, g_a = \begin{bmatrix} t_{a1}^* \\ t_{a2}^* - t_{a1}^* \\ t_{a3}^* - t_{a2}^* \\ \vdots \\ t_{a(n_a-2)}^* - t_{a(n_a-3)}^* \\ t_{a(n_a-1)}^* - t_{a(n_a-2)}^* \\ t_{an_a}^* - t_{a(n_a-1)}^* \end{bmatrix}. \quad (14)$$

Similarly, the constraints associated with phases b and c, (7c) and (7d), can be expressed by $$G_b \Delta t \leq g_b \quad (15a)$$

$$G_c \Delta t \leq g_c \quad (15b)$$

The matrices $G_b$, $G_c$ and vectors $g_b$, $g_c$ are defined according to (14).

The single-phase constraints (13) and (15) can be aggregated to $$G\Delta t \leq g \quad (16)$$

with $$G = \begin{bmatrix} G_a & 0 & 0 \\ 0 & G_b & 0 \\ 0 & 0 & G_c \end{bmatrix} \text{ and } g = \begin{bmatrix} g_a \\ g_b \\ g_c \end{bmatrix}, \quad (17)$$

where 0 denotes zero matrices of appropriate dimensions.

Control of the Third Variable

The third variable error term is $$J_2(\Delta t) = \lambda \|\zeta - \zeta_{corr}(\Delta t)\|_2^2 \quad (18)$$

where the third variable correction function $\zeta_{corr}$ may be assumed to be linear in the time-shifts.

$$\zeta_{corr}(\Delta t) = -V_2 \Delta t \quad (19)$$

Examples for the third variable $\zeta$, as well as the matrix $V_2$, will be given below for neutral point potential control and circulating current control.

Optimization Problem

Collecting all the previous derivations, the cost function J may be written $$J(\Delta t) = J_1(\Delta t) + J_2(\Delta t) + \Delta t^T R \Delta t = \quad (20a)$$

$$\left\| \begin{bmatrix} \tilde{\psi}_{\alpha\beta} - \psi_{\alpha\beta,corr}(\Delta t) \\ \tilde{\zeta} - \zeta_{corr}(\Delta t) \end{bmatrix} \right\|_Q^2 + \Delta t^T R \Delta t, \quad (20b)$$

where $\|x\|_Q^2 = x^T Q x$ and $Q=\text{diag}([1\ 1\ \lambda])$. By inserting (12) and (19) into (20b), the latter equation can be rewritten as $$J(\Delta t) = \|\tilde{y} + V\Delta t\|_Q^2 + \Delta t^T R \Delta t, \quad (21)$$

where $$\tilde{y} = \begin{bmatrix} \tilde{\psi}_{\alpha\beta} \\ \tilde{\zeta} \end{bmatrix} \text{ and } V = \begin{bmatrix} V_1 \\ V_2 \end{bmatrix}.$$

Expanding the cost function (21) leads to $$J(\Delta t) = (\tilde{y} + V\Delta t)^T Q(\tilde{y} + V\Delta t) + \Delta t^T R \Delta t \quad (22)$$

which can be further simplified to $$J(\Delta t) = \Delta t (V^T Q V + R)\Delta t + 2\tilde{y}^T Q V \Delta t + \tilde{y}^T Q \tilde{y} \quad (23)$$

by completing the squares. Defining $$H = V^T Q V + R \text{ and } c = V^T Q^T \tilde{y} \quad (24)$$

and neglecting the constant offset term $\tilde{y}^T Q \tilde{y}$ in (23), the cost function J may be written in standard form $$J(\Delta t) = \Delta t^T H \Delta t + 2c^T \Delta t. \quad (25)$$

Thus, minimizing the cost function (25) subject to the inequality constraints (16) leads to the Quadratic Program (QP)

$$\min_{\Delta t} \Delta t^T H \Delta t + 2c^T \Delta t \quad (26a)$$

$$\text{subj. to } G\Delta t \leq g. \quad (26b)$$

This Quadratic Program is equivalent to the formulation (7), if the third variable correction function is linear in the time-shifts.

The Quadratic Program may be solved online in the controller 16 or may be solved offline and the algebraic offline solution may be evaluated in the controller 16 to get a solution for the Quadratic Program.

Deadbeat Control

There also is a computationally less demanding version of the optimization problem (7), which may be seen as a deadbeat control method.

In the deadbeat control method, the weight matrix R is set to zero in the cost function J, and the optimization horizon is set as a minimum time interval starting at the current time instant, such that three phases exhibit switching instants.

If the optimization problem is formulated as a Quadratic Program (such as (26a) and (26b) above), the solution of the deadbeat control method may reduce to a simple projection operation.

In the following, two applications of the control method are described and explicit formulas for the third variable are provided.

Control of Neutral Point Potential

Figure 5:
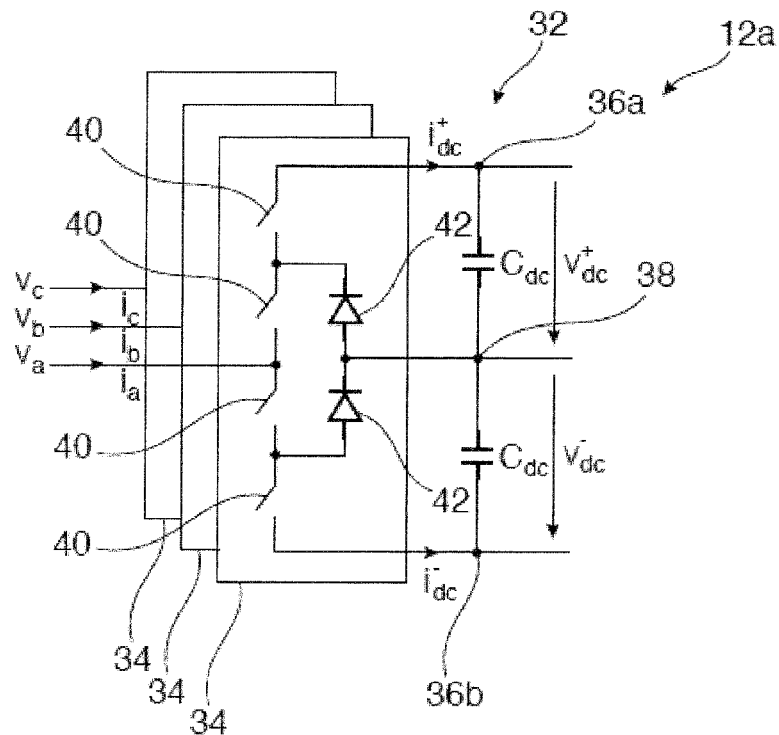
FIG. 5 schematically shows a neutral point clamped converter for a system according to an embodiment of the invention.

FIG. 5 schematically shows a neutral point clamped converter 12a, which may be part of the system 10. The neutral point clamped converter 12a comprises a DC link 32 that is common to the three converter phase circuits 34. The split DC link 32 comprises a positive point 36, a negative point 38 and a neutral point 40, between a positive and a negative DC voltage, $v_{dc}^+$ and $v_{dc}^-$ is provided. The voltages $v_{dc}^+$ and $v_{dc}^-$ are switched in the circuits 34 via power electronic semiconductor switches.

Each circuit 34 comprises four series-connected semiconductor switches 40, which are connected in parallel to the positive point 36 and the negative point 38 and which provide one output phase in their middle. Between the two upper and the two lower series-connected semiconductor switches 40, a series-connected pair of diodes 42 is connected, which are connected in their middle to the neutral point 40.

A problem that may arise in this topology is that any imbalance in the operation may generate a difference between the currents charging the capacitors $C_{dc}$, $i_{dc}^+$ and $i_{dc}^-$, which may lead to uneven charging/discharging of the two capacitors. The imbalance may be caused by imperfect switching, differences in the DC capacitors characteristics due to manufacturing tolerances, ageing, inconsistencies in switching device characteristics or imbalances in operation between the three phases. The consequence is a difference between the upper and lower DC link voltages, resulting in a non-zero neutral point potential. The neutral point potential is defined as $$v_{np} = v_{dc}^+ - v_{dc}^-, \quad (27)$$

i.e. as the difference between the voltages of the upper and the lower DC link capacitors $C_{dc}$.

Fluctuations and drifts in the neutral point potential may cause overvoltages in sensitive components of a converter and may introduce undesired harmonics. Therefore, a control of the neutral point potential may be an important part of high performance drives.

The dynamic of the neutral point potential is given by $$\frac{d}{dt} v_{np} = -\frac{1}{C_{dc}} i_{np}, \quad (28)$$

where $i_{np}$ denotes the neutral point current. A phase contributes to the neutral point current, when the switch position in this phase is zero, allows to write $$i_{np} = (1-|u_a|)i_a + (1-|u_b|)i_b + (1-|u_c|)i_c. \quad (29)$$

In each phase $x \in \{a,b,c\}$, we define the new variable $$s_x = 1 - |u_x| = \begin{cases} 0 & \text{if } u_x \in \{-1, 1\} \\ 1 & \text{if } u_x = 0 \end{cases}. \quad (30)$$

With this, the neutral current can be written in the compact form $$i_{np} = s_a i_a + s_b i_b + s_c i_c. \quad (31)$$

The control objective is to control a drift or the DC component in the neutral point potential, rather than a harmonic or an AC component. In the following, two versions of neutral point control are described.

Control of Instantaneous Neutral Point Potential

In this embodiment, the third controlled variable $\zeta$ is the instantaneous neutral point potential $v_{np}$.

The neutral point potential at a future time instant $t_1 > t$ can be controlled by manipulating the time instants of switching instants within the time window $[t\ t_1]$. More specifically, in phase x, consider the i-th switching instant $\Delta u_{xi}(t_{xi})$. Its transition time can be modified by $\Delta t_{xi} = t_{xi} - t^*_{xi}$, where $t^*_{xi}$ denotes the nominal switching instant of this switching instant and $t_{xi}$ refers to the modified switching instant.

The neutral point potential at $t_1$ can be computed by inserting (31) into (28) and integrating both sides from t to $t_1$.

$$v_{np}(t_1) = v_{np}(t) - \frac{1}{C_{dc}} \int_t^{t_1} (i_a(\tau)s_a(\tau) + i_b(\tau)s_b(\tau) + i_c(\tau)s_c(\tau))d\tau. \quad (32)$$

Consider the contribution from phase a over the time interval $[t\ t_1]$ $$\Delta v_{np,a} = -\frac{1}{C_{dc}} \int_t^{t_1} i_a(\tau)s_a(\tau)d\tau. \quad (33)$$

Assume that one switching instant occurs in phase a in this time interval. Let $\Delta u_a = u_{a1} - u_{a0}$ denote the switching instant, where $\Delta u_a$ is a nonzero integer. Correspondingly, $$\Delta s_a = s_{a1} - s_{a0}. \quad (34)$$

The nominal switching time is $t^*_a$, while the actual or modified switching time is $$t_a = t^*_a + \Delta t_a. \quad (35)$$

In light of the assumption of one switching instant occurring in phase a within $[t\ t_1]$, (33) can be rewritten as $$\Delta v_{np,a} = -\frac{1}{C_{dc}} i_a(t)\left(\int_t^{t_a} s_{a0} d\tau + \int_{t_a}^{t_1} s_{a1} d\tau\right), \quad (36)$$

where it is assumed that the phase a current $i_a$ is constant over the time interval [t $t_1$]. With the help of (34) and (35), (36) can be reformulated to $$\Delta v_{np,a} = -\frac{1}{C_{dc}} i_a(t)(s_{a0}(t_1 - t) + \Delta s_a t_1 - \Delta s_a t_a^* - \Delta s_a \Delta t_a). \quad (37)$$

As can be seen, the phase a contribution to the neutral point potential at time $t_1$ can be manipulated through the last term in (37), using the switching time modifications $\Delta t_a$. We interpret this last term in (37) as a correction to the neutral point potential, and the neutral point potential correction function for one time-shift is $$v_{np,corr,a}(\Delta t_a) = \frac{1}{C_{dc}} i_a(t) \Delta s_a \Delta t_a. \quad (38)$$

More specifically, modifying the switching instant by $\Delta t_a$ changes the phase a contribution to the neutral point potential by $v_{np,corr,a}(\Delta t_a)$.

In a next step, the correction is generalized to the neutral point potential of three phases and to an arbitrary number of switching instants. Consider the neutral point potential correction over the time interval [tt+$T_p$]. Assume that $n_x$ switching instants are located within the time interval [tt +$T_p$] in phase x. As before, assume that the phase currents are constant within [tt+$T_p$]. This leads to the correction to the neutral point potential $$v_{np,corr}(\Delta t) = \quad (39)$$

$$\frac{1}{C_{dc}} \left( i_a(t) \sum_{i=1}^{n_a} \Delta s_{ai} \Delta t_{ai} + i_b(t) \sum_{i=1}^{n_b} \Delta s_{bi} \Delta t_{bi} + i_c(t) \sum_{i=1}^{n_c} \Delta s_{ci} \Delta t_{ci} \right)$$

as a function of the phase currents, switching instants and modifications to the switching time instants. Equivalently, (39) can be stated as the scalar product $$v_{np,corr}(\Delta t) = \quad (40)$$

$$\frac{1}{C_{dc}} [i_a \Delta s_{a1} i_a \Delta s_{a2} \ldots i_a \Delta s_{an_a} i_b \Delta s_{b1} \ldots i_b \Delta s_{bn_b} i_c \Delta s_{c1} \ldots i_c \Delta s_{cn_c}]$$

$$\Delta t =: -V_2 \Delta t,$$

where the time dependency from the phase currents has been dropped to simplify the notation.

To obtain a three-dimensional formulation that enables control of the instantaneous neutral point potential, the neutral point potential is used as the third variable ($\zeta = v_{np}$), which results in the following third variable correction term in the cost function J:

$$J_2(\Delta t) \lambda \| \tilde{v}_{np} - v_{np,corr}(\Delta t) \|_2 \quad (41)$$

where $\tilde{v}_{np}$ refers to the error in the neutral point potential at time t, $v_{np,corr}(\Delta t)$ is the correction function for the neutral point potential applied from t to t+$T_p$, and $\lambda$ is a non-negative scalar weight. The three-dimensional problem is then formulated as:

$$\min_{\Delta t} J(\Delta t) = \|\tilde{\psi}_{\alpha\beta} - \psi_{\alpha\beta,corr}(\Delta t)\|_2^2 + \lambda \|\tilde{v}_{np} - v_{np,corr}(\Delta t)\|_2^2 + \Delta t^T R \Delta t. \quad (42a)$$

s.t.

$$kT_s \leq t_{a1} \leq t_{a2} \leq \ldots \leq t_{an_a} \leq t_{a(n_a+1)}^* \quad (42b)$$

$$kT_s \leq t_{b1} \leq t_{b2} \leq \ldots \leq t_{bn_b} \leq t_{b(n_b+1)}^* \quad (42c)$$

$$kT_s \leq t_{c1} \leq t_{c2} \leq \ldots \leq t_{cn_c} \leq t_{c(n_c+1)}^*. \quad (42d)$$

Here, $\lambda \in \mathbb{R}$, $\lambda \geq 0$, and $R \in \mathbb{R}^{(n_a+n_b+n_c) \times (n_a+n_b+n_c)}$, $R \geq 0$, are weighting factors. The corrections of switching instants are aggregated in the vector $$\Delta t = [\Delta t_{a1} \Delta t_{a2} \ldots \Delta t_{an_a} \Delta t_{b1} \ldots \Delta t_{bn_b} \Delta t_{c1} \ldots \Delta t_{cn_c}]^T. \quad (43)$$

Since the model of the correction function $v_{np,corr}$ in (40) has the same form in (19), the three-dimensional problem can be cast in the form (26). The output error is defined as $$\tilde{y} = [\tilde{\psi}_\alpha \tilde{\psi}_\beta \tilde{v}_{np}]^T \quad (44)$$

and the matrix V as $$V = \begin{bmatrix} \frac{V_{dc}}{6} & 0 & 0 \\ 0 & \frac{V_{dc}}{6} & 0 \\ 0 & 0 & -\frac{1}{C_{dc}} \end{bmatrix} \begin{bmatrix} 2\Delta u_{a1} & 0 & i_a \Delta s_{a1} \\ \vdots & \vdots & \vdots \\ 2\Delta u_{an_a} & 0 & i_a \Delta s_{an_a} \\ -\Delta u_{b1} & \sqrt{3} \Delta u_{b1} & i_b \Delta s_{b1} \\ \vdots & \vdots & \vdots \\ -\Delta u_{bn_b} & \sqrt{3} \Delta u_{bn_b} & i_b \Delta s_{bn_b} \\ -\Delta u_{c1} & -\sqrt{3} \Delta u_{c1} & i_c \Delta s_{c1} \\ \vdots & \vdots & \vdots \\ -\Delta u_{cn_c} & -\sqrt{3} \Delta u_{cn_c} & i_c \Delta s_{cn_c} \end{bmatrix}^T \quad (45)$$

The definitions (24), (14) and (17) also apply to this formulation.

The three-dimensional control problem for instantaneous neutral point potential control may be formulated as a deadbeat control method or as a full quadratic program as described above.

Preventing Drift of Neutral Point Potential

When a control objective in a neutral point clamped converter 12a is to control drift and large fluctuations of the neutral point potential, the neutral point potential may be filtered or higher harmonic contributions may be otherwise removed from the reference before the cost function is evaluated.

For example, the estimated neutral point potential may be filtered. Let $\bar{v}^*_{np}(t)$ denote the reference of the DC component of the neutral point potential, which is typically zero. Correspondingly, the DC component of the neutral point potential at time t is given by $\bar{v}_{np}(t)$. To only include the DC component as third variable, the estimated neutral point potential $v_{np}(t)$ may be low pass filtered or averaged over an appropriate window, such as a sixth of the fundamental period.

Furthermore, the neutral point ripple, i.e. the higher order contributions to the neutral point potential, may be precomputed based on optimized pulse patterns. Based on the overall system model and precomputed optimized pulse patterns, one can determine the neutral point potential ripple that arises due to a switching as a function of the voltage phase angle. This precomputed neutral point potential ripple may then be added to the DC component of neutral point potential reference, which is typically zero, to form the full neutral point potential reference: $v^*_{np} = \bar{v}^*_{np} + v^*_{np,ripple}$. In such formulation, only the unwanted part of the neutral point potential, which occurs for the reasons other than nominal switching, may be controlled.

Control of Averaged Neutral Point Potential

In this embodiment, the third variable $\zeta$ is the third axis $\gamma$-flux, i.e., $\zeta = \psi_\gamma$.

The instantaneous neutral point potential $V_{np}(t)$ is known to oscillate with fundamental frequency $3\omega_1$. Therefore, the instantaneous value of $v_{np}(t)$ alone may provide little information about the averaged neutral point potential that we wish to control.

A control of an averaged neutral point potential in a neutral point clamped converter 12a may comprise the following three steps:

In a first step, the necessary $\tilde{\psi}_\gamma$ correction to drive the average neutral point potential to the desired value may be determined.

In this step, the neutral point potential is averaged over a fundamental period, where T is the period of the fundamental frequency. Let $v_{np}(t)$ denote the neutral point potential at the current time t and $v_{np}^{des}(t+T)$ be the desired neutral point potential at time t+T. The $\psi_\gamma$ that achieves this is given by $$\psi_\gamma = \sin^{-1}\left(\frac{C_{dc}\omega_1(v_{np}^{des}(t+T) - v_{np}(t))}{12I\cos(\theta)\sigma}\right)\frac{v_{dc}}{L-1}, \quad (46)$$

where $C_{dc}$ is the DC link capacitance, $\omega_1$ is the electrical angular speed, $v_{dc}$ is the total DC link voltage, I is the peak current at the converter terminals, $\cos(\theta)$ is the power factor, L is the number of levels and $\sigma$ is a constant given by the optimized pulse pattern used. More specifically, for an optimized pulse pattern with N switches in the first 90 degrees, and nominal switching times $t_n$, n=1,2,...,N $$\sigma = \sum_{n=1}^{N} \sin(t_n). \quad (47)$$

For obtaining (46) it is assumed that the angular corrections caused by $\tilde{\psi}_\gamma$ are given by $$\delta(\tilde{\psi}_\gamma) = \tilde{\psi}_\gamma \frac{L-1}{v_{dc}}. \quad (48)$$

This assumption is satisfied for deadbeat control. For a quadratic program, the error caused by this assumption is negligible.

In this embodiment, the optimal third variable $\zeta^*$ is provided by (46) evaluated for the neutral point potential derived from the optimized pulse pattern and the estimated third variable $\zeta$ is the corresponding flux determined based on measurements in the converter 12a.

In a second step, an adjusted modulation index may be determined, since the introduction of a $\tilde{\psi}_\gamma$ may change the magnitude of the fundamental component of the converter's output voltage. When a nonzero $\psi_\gamma$ is used, the amplitude of the fundamental phase voltage is changed. This change may be quantified so it can be taken into account when selecting the modulation index.

In a third step, a switching angle correction induced by the flux error $\tilde{\psi}$ in $\alpha,\beta,\gamma$ may be determined using the deadbeat or quadratic program control method described above.

It also may be possible to average the neutral point potential not over a fundamental period but over a time window of size W, which may be smaller than the time window of the fundamental period T. This averaged neutral point potential then may be used to compute the required $\psi_\gamma$. Notice that by making W<T, it is possible to drive the neutral point potential to a desired reference in less than one fundamental period.

For example, the averaged neutral point potential between time t−W and t may be defined as $$\bar{v}_{np}(t) = \frac{1}{W}\int_{t-W}^{t} v_{np}(\tau)d\tau. \quad (49)$$

The signal $\bar{v}_{np}(t)$ may be sampled at times t=0, W, 2W, 3W, ... $\psi_\gamma(t)$ also may be maintained constant in the interval $(k-1)W < t \leq kW$, for $k \in \mathbb{N}$.

The required $\psi_\gamma(t)$ to drive the averaged neutral point potential to zero within a time window W is then given by $$\psi_\gamma(t) = -\frac{v_{dc}}{L-1}\sin^{-1}\left(\frac{TC_{dc}\omega_1\bar{v}_{np}(t)}{12WI\cos(\theta)\sigma} + \frac{\sin\left(\frac{L-1}{v_{dc}}\psi_\gamma(t-W)\right)}{2}\right) \quad (50)$$

Control of a Circulating Current

Figure 6:
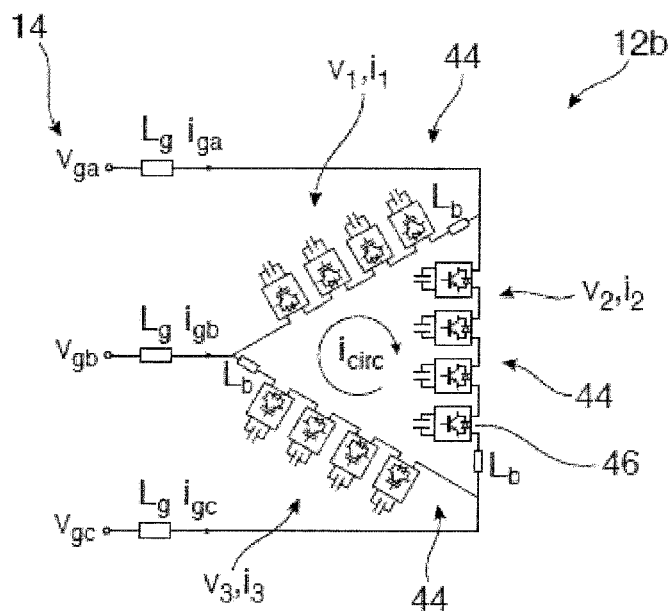
FIG. 6 schematically shows a modular multi-level converter for a system according to an embodiment of the invention.

FIG. 6 shows a modular multi-level converter 12b, which comprises three branches 44 each of which comprises a plurality of series-connected converter cells 46. The branches 44 are delta-connected and interconnect the three phases of an electrical grid 14.

Figure 7:
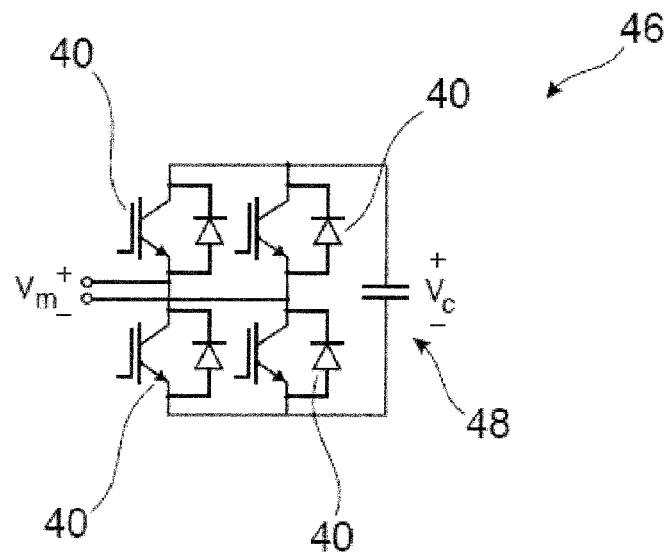
FIG. 7 schematically shows a converter cell for the converter of FIG. 6.

As shown in FIG. 7, each converter cell 46 comprises a cell capacitor 48. The semiconductor switches 40 of the cell 46, which are configured as an H-bridge, are adapted for connecting the cell capacitor in two directions to the branch 44 and to disconnect the cell capacitor 48 from the branch 44. The converter cell 46 is a bipolar cell. Each semiconductor switch 40 comprises an actively controlled power semiconductor and a freewheeling diode.

FIGS. 6 and 7 furthermore show variables used in the following formulas, such as currents and voltages.

Figure 8:
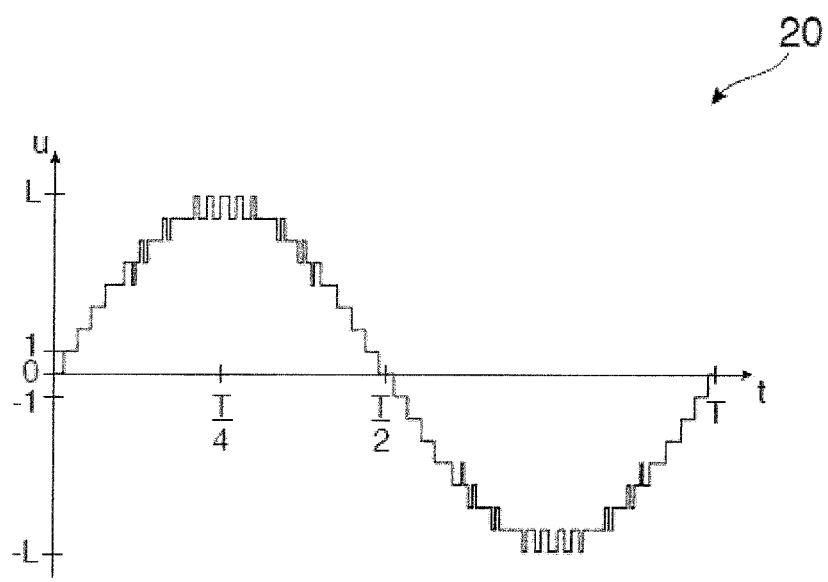
FIG. 8 shows a diagram with an optimized pulse pattern that may be used with the converter of FIG. 6.

As example, FIG. 8 shows an optimized pulse pattern 20 for a converter branch 44 of the converter 12b. The pattern 20 is an optimized pulse pattern for one phase of the modular multi-level converter 12b. The optimized pulse patterns 20 for other phases may be obtained by phase-shifting the optimized pulse patterns corresponding to the required modulation index.

The modular multi-level topology is particularly well-suited for Statcom applications, because there is no permanent active power exchanged with the grid 12. Therefore, the module capacitors 48 may be precharged by taking the power from the grid 12, while during the Statcom nominal operation their average charge remains the same. This is possible because during nominal Statcom operation, the currents and voltages of each individual branch are phase-shifted by 90°. Therefore, if the pulse pattern is symmetric, the mean voltage at the module capacitors remains constant during nominal operation.

The Statcom control is required to generate sinusoidal currents $i_a$, $i_b$ and $i_c$ that are generated/absorbed by the Statcom. Typically, the reference for the output current is given by the positive-sequence three-phase currents.

However, the reference of the Statcom currents can include also the negative sequence currents. This is required if some plant connected to the grid generates a strong negative-sequence current, which can then be compensated by injecting the currents of the opposite phase by the Statcom.

During imbalanced operating scenarios, the voltages and the currents in the branches 44 (computed directly from the line current requirements) are not phase-shifted by 90° in all branches 44. Consequently, active power is exchanged with the grid 14. As a result, the mean voltage of the cell capacitors 48 starts to drift, which may lead to inappropriate operation of the modular multi-level converter 12b.

Energy balancing between the converter branches 44 may be done by means of additional current or voltage control. By controlling the circulating current $i_{circ}$ in the modular multi-level converter 12b, the imbalance can be compensated by sending the active power around the branches 44 of the converter 12b, instead of exchanging the active power with the grid 14. This enables the functional operation of the Statcom during imbalances. The carrier of the energy is the circulating current $i_{circ}$, which is defined as $$i_{circ} = \frac{1}{3}(i_1 + i_2 + i_3), \tag{51}$$

where $i_1$, $i_2$ and $i_3$ are the branch currents. The circulating current $i_{circ}$ flows inside the delta of the converter 12b.

In Statcom applications, the control of the circulating current $i_{circ}$ may be used for the purpose of branch energy balancing in the following ways:

The circulating current $i_{circ}$ may be eliminated during normal operation to prevent a large ripple of cell capacitor voltages and, in particular, a drift of the cell capacitor voltages. The unwanted circulating current $i_{circ}$ arises from any common-mode voltage that is generated by the converter 12b. Due to the inductance $L_b$ in the converter branches 44, the circulating current $i_{circ}$ depends on the integral of the common-mode voltage, which is the reason why the circulating current $i_{circ}$ is especially susceptible to drifting.

During imbalanced operation, the circulating current $i_{circ}$ may be used to re-establish an energy balance between the branches 44. The circulating current reference is a sinusoid at fundamental frequency.

A Statcom is often used in the so-called idle operation, i.e. it is connected to the grid 14 but the current flow between the grid 14 and the converter 12b needs to be zero. During the idle operation, one can inject a circulating current $i_{circ}$ in order to activate the cell balancing algorithm that will redistribute voltages among the capacitors 48 within one branch 44 and balance them. For this purpose, typically a sinusoidal circulating current $i_{circ}$ at triple fundamental frequency is injected.

Furthermore, the control of the circulating current i circ may be to reduce a voltage ripple in nominal operation, for which 2nd and 4th current harmonics may have to be injected.

In the following, a circulating current control for the converter 12b based on the method described with FIG. 2 is presented as a further embodiment.

The voltage $v_{123}$ is referred to as converter voltage. To simplify the exposition, it is assumed that the voltage of the cell capacitors 48 is constant. The converter voltage $v_{123}$ obtained by modulation based on an optimized pulse pattern 20 is described as $v_{123} = u_{123} v_c$, where $u_{123}$ denotes the three-phase optimized pulse pattern for modular multi-level converter 12b. The variable u denotes the number of the converter cells 46 in a branch 44, in which the converter cell output is connected to the capacitor 48. The connection of a capacitor 48 to the output of the converter cell $v_m$ with the same polarity leads to positive u, while connecting it with opposite polarity leads to negative u.

The voltages $v_{g,abc}$ denote the voltages at the point of connection to the grid 14 (usually at the point of common coupling) and are typically measured. The currents $i_{g,abc}$ are injected into the grid by the converter 12b. The current reference $i^*_{g,abc}$ is obtained from the grid control level and needs to be tracked by the converter 12b. The inductances in the grid connection (which includes the transformer inductance) are denoted as $L_g$ and the inductors in the branches 44 of the modular multi-level converter 12b are denoted as $L_b$. The branch currents are denoted as $i_{123}$, while $i_{circ}$ denotes the circulating current.

The tracking of grid currents $i_{g,abc}$ and, in particular, the circulating current $i_{circ}$ may be tracked by using the control method as described above, i.e. by applying time-shifts to the switching instants 28 determined from an optimized pulse pattern 20.

Modelling the Fundamental Converter Flux Reference

The circuit in FIG. 6 is described by the following equations that arise from Kirchhoff laws:

$$v_{123} - D_1 v_{g,abc} = L_b \frac{d}{dt} i_{123} + L_g D_1 \frac{d}{dt} i_{abc}, \tag{52}$$

$$i_{g,abc} = D_2 i_{123}, \tag{53}$$

where $$D_1 := \begin{bmatrix} 1 & -1 & 0 \\ 0 & 1 & -1 \\ -1 & 0 & 1 \end{bmatrix} \text{ and } D_2 := \begin{bmatrix} 1 & 0 & -1 \\ -1 & 1 & 0 \\ 0 & -1 & 1 \end{bmatrix}.$$

The equation (52) can be integrated over time to obtain, according to the definition of flux (2), $$\psi_{123} - D_1 \psi_{g,abc} = L_b i_{123} + L_g D_1 i_{abc}, \tag{54}$$

where $\psi_{g,abc}$ is the flux at the point of grid connection and $\psi_{123}$ is the converter flux.

Now consider the transformation of the three phase system to stationary orthogonal αβγ coordinates (Clarke transformation). This transformation is bijective and therefore invertible:

$$(\bullet)_{\alpha\beta\gamma} = M_c(\bullet)_{abc}, \quad (\bullet)_{abc} = M_c^{-1}(\bullet)_{\alpha\beta\gamma}, \tag{55}$$

where $$M_c = \frac{2}{3} \begin{bmatrix} 0 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix}.$$

Note that according to this definition and (51) the γ-component of the branch currents $i_\gamma$ corresponds to the circulating current $i_{circ}$:

$$i_\gamma = \frac{1}{3}(i_1 + i_2 + i_3) = i_{circ}. \tag{56}$$

In the following, the notions of circulating current and γ converter current is used interchangeably.

Introducing the substitution $(\bullet)_{abc} = M_c^{-1}(\bullet)_{\alpha\beta\gamma}$ in (52)-(53) and multiplying the equations by $M_c$ from left leads to the following equations:

$$\psi_{\alpha\beta\gamma} - \hat{D}_1 \psi_{g,\alpha\beta\gamma} = L_b i_{\alpha\beta\gamma} + L_g \hat{D}_1 i_{g,\alpha\beta\gamma}, \quad (57)$$

$$i_{g,\alpha\beta\gamma} = \hat{D}_2 i_{\alpha\beta\gamma} \quad (58)$$

where $$\hat{D}_1 = M_c D_1 M_c^{-1} = \begin{bmatrix} \sqrt{3} M^T & \begin{bmatrix} 0 \\ 0 \end{bmatrix} \\ [0 \ 0] & 0 \end{bmatrix},$$

$$\hat{D}_2 = M_c D_2 M_c^{-1} = \begin{bmatrix} \sqrt{3} M & \begin{bmatrix} 0 \\ 0 \end{bmatrix} \\ [0 \ 0] & 0 \end{bmatrix}.$$

Here, $$M := \begin{bmatrix} \frac{\sqrt{3}}{2} & \frac{1}{2} \\ -\frac{1}{2} & \frac{\sqrt{3}}{2} \end{bmatrix}$$

is a matrix that describes the vector rotation for 30° clockwise. Note that this matrix is regular and its inverse is given by $M^{-1} = M^T$. In (57)-(58), $\psi_{\alpha\beta\gamma}$ stands for the transformed converter flux $\psi_{123}$, $i_{\alpha\beta\gamma}$ is the transformed branch current, while $\psi_{t,\alpha\beta\gamma}$ and $i_{g,\alpha\beta\gamma}$ are the transformed grid flux and output current.

The equations (57)-(58) are equivalent to the following equations separated in αβ- and γ-related equations:

$$\psi_{\alpha\beta} - \sqrt{3} M^T \psi_{g,\alpha\beta} = L_b i_{\alpha\beta} + \sqrt{3} L_g M^T i_{g,\alpha\beta} \quad (59)$$

$$i_{g,\alpha\beta} = \sqrt{3} M i_{\alpha\beta} \quad (60)$$

$$\psi_\gamma = L_b i_\gamma \quad (61)$$

$$i_{g,\gamma} = 0. \quad (62)$$

From these equations, the following may be concluded:

The control of the output currents of the Statcom $i_{abc}$ may be achieved by controlling the αβ-components of the converter flux $\psi_{\alpha\beta}$. The reference for the converter flux in αβ is:

$$\psi_{\alpha\beta,ref} = \sqrt{3} M^T \left( \psi_{g,\alpha\beta} + \left( L_g + \frac{1}{3} L_b \right) i_{g,\alpha\beta,ref} \right), \quad (63)$$

where $\psi_{g,\alpha\beta}$ is the estimate of the flux at grid connection and $i_{g,\alpha\beta,ref}$ is the reference for the output current obtained from the grid controller. In case of the connection to a weak grid, in which case the grid flux is dynamically dependent on the output currents, or in the cases of unknown parameters, this feed-forward determination of the converter flux references may be replaced by feedback loop.

The control of the circulating current $i_{circ}$ may be achieved by controlling only the γ-component of the converter flux. The reference for the γ-flux can be determined as:

$$i_{\gamma,ref} = L_b i_{circ,ref} \quad (64)$$

where the circulating current reference $i_{circ,ref}$ is obtained from an outer control loop.

From what is shown in the above, the control of the output currents and circulating current $i_{circ}$ of the modular multi-level converter 12b may be achieved by controlling the αβ- and γ-components of the converter flux. In particular, the optimal third variable ζ* may be $L_b i_{circ,ref}$ determined from the circulating current reference $i_{circ,ref}$ provided by an outer control loop and the estimated third variable ζ may be $L_b i_{circ}$ determined from the estimated circulating current $i_{circ}$.

Consideration of Common Mode Voltage

With the control method for the modular multi-level converter 12b, one may need to track a fast evolving γ-flux reference. Therefore, it may be necessary that a ripple of the γ-component is taken into account. The nominal ripple of the γ-component is defined by the optimized pulse patterns 20 that are used and may be computed from the optimized pulse patterns 20 and the nominal system model.

Two approaches for circulating current tracking are described in the following. Note that we denote the fundamental of the γ flux as $\psi_{\gamma,ref}$, while $\psi^*_\gamma$ denotes the optimal γ-flux with the nominal ripple included. This may be seen equivalent to the notation of $\psi_{\gamma\beta,ref}$ and $\psi^*_{\alpha\beta}$.

Figure 9:
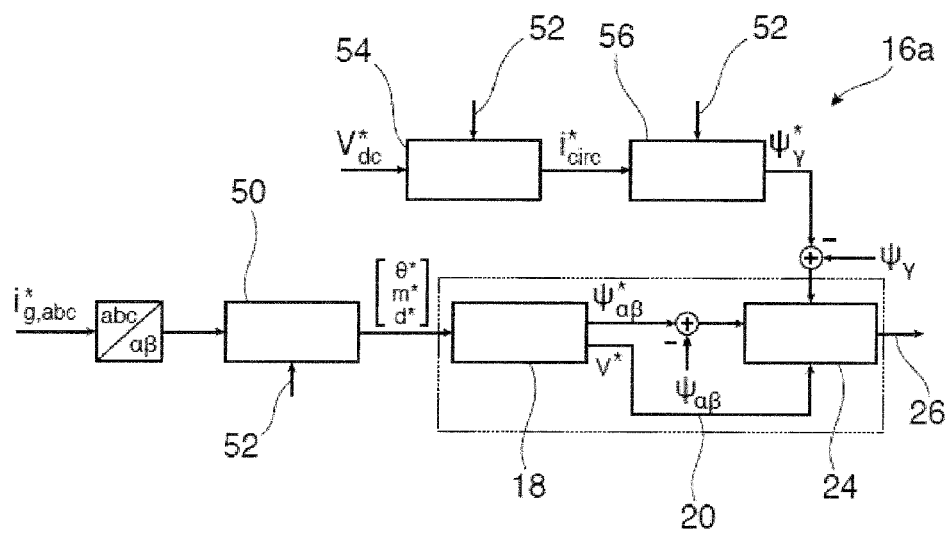
FIG. 9 schematically shows a controller according to an embodiment of the invention.

FIG. 9 shows a controller 16a, which may be used with design optimized pulse patterns 20 that do not have a common-mode voltage. With this approach, the setup of the online controller 16a may be simplified. A current controller 50 for the Statcom receives a Clarke transformed current reference $i^*_{g,abc}$ and together with measurements from the system 10 determines a reference flux $\psi_{\alpha\beta,ref}$ from which a reference flux angle θ*, a modulation index m* and pulse number d* is determined. From these inputs, the pattern selector 18 selects appropriate optimized pulse patterns 20 and determines an optimal flux $'^*_{\alpha\beta}$. An estimated flux $\psi_{\alpha\beta}$ is subtracted from the optimal flux $\psi^*_{\alpha\beta}$ to determine a flux error.

From a DC link voltage $V^*_{DC}$ and system measurements 52, a balancing controller 54 for the branch energy estimates an optimal circulating current $i_{circ}$, which by a circulating current controller 56 is translated together with system measurements 52 in an optimal γ-flux reference $\psi^*_\gamma$. The γ-flux error is determined by subtracting an estimated γ-flux $\psi_\gamma$.

The pattern optimizer 24 then determines a modified optimized pulse pattern 20 from both errors. As indicated in FIG. 9, the optimization procedure in the pattern optimizer 24 that is utilized to compute optimized pulse patterns 20 may be constrained only to the optimized pulse patterns 20 that exhibit no common mode in the three-phase system, which translates to zero γ-flux reference. Thus, the γ-flux may be determined independently from the selection of the optimized pulse pattern 20. However, in this case, the feasible set for optimized pulse pattern computation may be smaller than in the nominal case, which may lead to spectrally suboptimal optimized pulse patterns 20.

Figure 10:
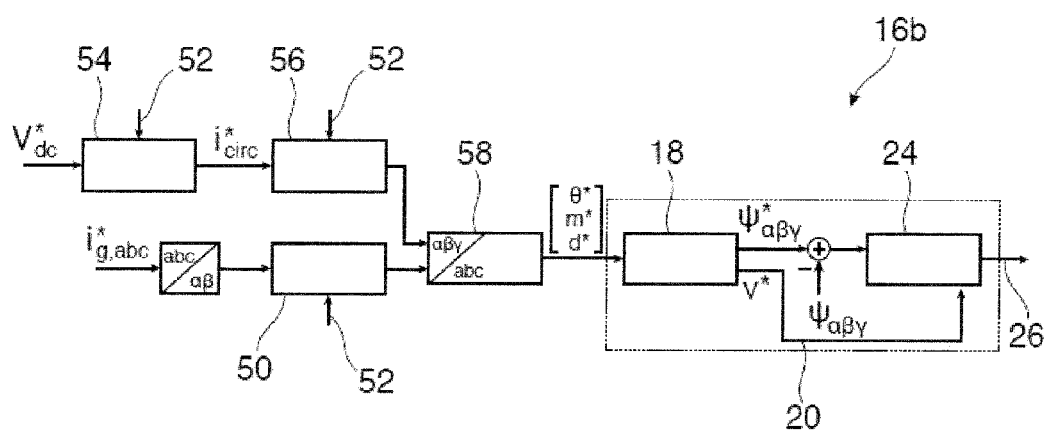
FIG. 10 schematically shows a controller according to a further embodiment of the invention.

FIG. 10 shows a controller 16b, which may be used with design optimized pulse patterns 20 that have a limited amount of common-mode voltage. The ripple of the common-mode voltage cannot be provisionally large because it would cause large charging and discharging of the cell capacitors 48. However, a certain amount of common-mode voltage may be allowed.

Contrary to FIG. 9, in FIG. 10, the output of the circulating current controller 56 is input into a control logic 58, which also receives the output of the current controller 50 and determines the angle θ*, the modulation index m* and the pulse number d* on both outputs.

After that, the pattern selector 18 determines a three-component optimal flux $\psi^*_{\alpha\beta\gamma}$ from which a three-component error is determined, which is treated by the pattern optimizer 24 as two-component flux error and third variable error.

In this case, the spectral suboptimality of the computed optimized pulse patterns 20 may be reduced. However, the nominal ripple of the γ-flux may still exist and may have to be taken into account (if it is significantly large) in deriving the reference for the γ-component of the flux $\psi^*_\gamma$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter system
12 electrical converter
14 electrical grid
16 controller
18 pattern selector
20 optimized pulse pattern
22 table with optimized pulse patterns
24 pattern optimizer
26 modified optimized pulse pattern
$\psi_{\alpha\beta,ref}$ reference flux
$\psi^*_{\alpha\beta}$ optimal flux
$\psi_{\alpha\beta}$ estimated flux
$\zeta^*$ optimal third variable
$\zeta$ estimated third variable
28 switching instant
30 prediction horizon
12a neutral point clamped converter
32 DC link
34 phase circuit
36a positive point
36b negative point
38 neutral point
40 semiconductor switch
42 diode
12b modular multi-level converter
44 converter branch
46 converter cell
48 cell capacity
50 current controller
52 system measurements
54 balancing controller
56 circulating current controller
58 control logic

The invention claimed is:

1. A method for controlling a three-phase electrical converter, the method comprising:
  selecting a three-phase optimized pulse pattern from a table of precomputed optimized pulse patterns based on a reference flux ($\psi_{\alpha\beta,ref}$);
  determining a two-component optimal flux ($\psi^*_{\alpha\beta}$) from the optimized pulse pattern and determine a one-component optimal third variable ($\zeta^*$);
  determining a two-component flux error from a difference of the optimal flux ($\psi^*_{\alpha\beta}$) and an estimated flux ($\psi_{\alpha\beta}$) estimated based on measurements in the electrical converter;
  determining a one-component third variable error from a difference of the optimal third variable ($\zeta^*$) and an estimated third variable ($\zeta$);
  modifying the optimized pulse pattern by time-shifting switching instants of the optimized pulse pattern such that a cost function depending on the time-shifts is minimized, wherein the cost function comprises a flux error term and a third variable error term, wherein the flux error term is based on a difference of the flux error and a flux correction function providing a flux correction based on the time-shifts and the third variable error term is based on a difference of the third variable error and a third variable correction function providing a third variable correction based on the time-shifts;
  applying the modified optimized pulse pattern to the electrical converter.

2. The method of claim 1,
  wherein the cost function comprises a third term quadratic in the time shifts; and/or
  wherein the optimal flux, the estimated flux, the flux error, the optimal third variable, the estimated third variable and/or the third variable error are computed over a predefined prediction horizon; and/or
  wherein the predefined prediction horizon is longer than two or more future time steps and only switching instants of the modified optimized pulse pattern during the next time step are applied to the electrical converter; and/or
  wherein the switching instants of the optimized pulse pattern are time-shifted within the prediction horizon; and/or
  wherein only the next future switching instants in every phase are time-shifted.

3. The method of claim 2, wherein the flux correction function and/or the third variable correction function is linear in the time-shifts and/or
  wherein the cost function is minimized by solving online a quadratic program.

4. The method of claim 2, wherein the third variable is based on a circulating current of a modular multi-level converter; and/or
  wherein the third variable is a flux determined from the circulating current.

5. The method of claim 4, wherein the optimized pulse patterns have been precalculated such that they generate no common mode voltage and an optimal third variable is directly determined from a circulating current reference.

6. The method of claim 1,
  wherein the flux correction function and/or the third variable correction function is linear in the time-shifts and/or
  wherein the cost function is minimized by solving online a quadratic program.

7. The method of claim 6, wherein the third variable is based on a circulating current of a modular multi-level converter; and/or
  wherein the third variable is a flux determined from the circulating current.

8. The method of claim 7, wherein the optimized pulse patterns have been precalculated such that they generate no common mode voltage and an optimal third variable is directly determined from a circulating current reference.

9. The method of claim 1,
wherein the third variable is based on a neutral point potential of a DC link of a neutral point clamped converter.

10. The method of claim 9, wherein the optimal third variable is the optimal neutral point potential determined from the optimized pulse pattern and the estimated third variable is the estimated neutral point potential determined form measurements in the converter.

11. The method of claim 10,
wherein a low pass filter is applied to the estimated neutral point potential and/or the estimated neutral point potential is averaged to control a drift of the neutral point potential;
wherein higher order contributions to the neutral point potential are offline precomputed for each optimized pulse pattern in the table and added to the estimated neutral point potential to control a drift of the neutral point potential.

12. The method of claim 9,
wherein the optimal third variable is a neutral point flux determined from an optimal neutral point potential integrated over time and the estimated third variable is the corresponding estimated neutral point flux determined from measurements in the converter.

13. The method of claim 1,
wherein the third variable is based on a circulating current of a modular multi-level converter; and/or
wherein the third variable is a flux determined from the circulating current.

14. The method of claim 13, wherein the optimized pulse patterns have been precalculated such that they generate no common mode voltage and an optimal third variable is directly determined from a circulating current reference.

15. The method of claim 1, wherein a Clarke transformed three-component optimal flux is determined from the optimized pulse pattern and split into the two-component optimal flux and into a one-component flux as optimal third variable.

16. The method of claim 1, wherein the flux error term and the third variable term have different weight factors.

17. A controller for an electrical converter structured to execute instructions to control the electrical converter, comprising:
select a three-phase optimized pulse pattern from a table of precomputed optimized pulse patterns based on a reference flux ($\psi_{\alpha\beta,ref}$);
determine a two-component optimal flux ($\psi^*_{\alpha\beta}$) from the optimized pulse pattern and determine a one-component optimal third variable ($\zeta^*$);
determine a two-component flux error from a difference of the optimal flux ($\psi^*_{\alpha\beta}$) and an estimated flux ($\psi_{\alpha\beta}$) estimated based on measurements in the electrical converter;
determine a one-component third variable error from a difference of the optimal third variable ($\zeta^*$) and an estimated third variable ($\zeta$);
modify the optimized pulse pattern by time-shifting switching instants of the optimized pulse pattern such that a cost function depending on the time-shifts is minimized, wherein the cost function comprises a flux error term and a third variable error term, wherein the flux error term is based on a difference of the flux error and a flux correction function providing a flux correction based on the time-shifts and the third variable error term is based on a difference of the third variable error and a third variable correction function providing a third variable correction based on the time-shifts;
apply the modified optimized pulse pattern to the electrical converter.

18. A converter system, comprising:
an electrical converter interconnected with an electrical grid; and
a controller according to claim 17.

19. The converter system of claim 18, wherein the electrical converter is a neutral point clamped converter adapted for converting a three-phase AC current into a DC current in a split DC link.

20. The converter system of claim 18, wherein the electrical converter is a modular multi-level converter comprising at least two converter branches and wherein each converter branch comprises a plurality of converter cells with own cell capacity.

* * * * *